US011190473B2

(12) United States Patent
Carnevale et al.

(10) Patent No.: US 11,190,473 B2
(45) Date of Patent: *Nov. 30, 2021

(54) DOCUMENT PROCESSING

(71) Applicant: International Business Machines Corporation, Armonk, NY (US)

(72) Inventors: Giulia Carnevale, Rome (IT); Marco Gianfico, Rome (IT); Ciro Ragusa, Rome (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,278

(22) Filed: Mar. 16, 2020

(65) Prior Publication Data

US 2020/0220826 A1 Jul. 9, 2020

Related U.S. Application Data

(63) Continuation of application No. 15/468,421, filed on Mar. 24, 2017, now Pat. No. 10,645,044.

(51) Int. Cl.
 *H04L 12/58* (2006.01)
(52) U.S. Cl.
 CPC .................... *H04L 51/12* (2013.01)
(58) Field of Classification Search
 CPC .............................. H04L 51/12; G06Q 10/107
 USPC ........................................................ 709/206
 See application file for complete search history.

(56) References Cited

U.S. PATENT DOCUMENTS

| 6,415,259 | B1 | 7/2002 | Wolfinger |
| 8,135,787 | B2 | 3/2012 | Bansal et al. |
| 9,141,940 | B2 | 9/2015 | Pocklington et al. |
| 2005/0216254 | A1 | 9/2005 | Gupta et al. |

(Continued)

FOREIGN PATENT DOCUMENTS

WO  WO 2013142852  9/2013

OTHER PUBLICATIONS

Whitney et al., Apple aims to prevent misdirected text messages, Retrieved from Internet on Oct. 4, 2016, https://www.cnet.com/news/apple-aims-to-prevent-misdirected-text-messages/, 10 pages.

(Continued)

*Primary Examiner* — Tan Doan
(74) *Attorney, Agent, or Firm* — Schmeiser, Olsen & Watts, LLP; Nicholas L. Cadmus

(57) ABSTRACT

A content score value is assigned to a text message for content categories. Context data values relating to the text message and to context categories are collected. A context score value for each context category is determined by comparing the context data values with context data threshold values. A content score value for each content category is determined by comparing the content data values with content data threshold values. A difference factor value is calculated as a square root of a summation over differences between the context score values and the content score values. If the difference factor value is determined to exceed a specified difference factor threshold value, then a confirmation is requested and received. The text message is sent by electronic mail to a receiving address.

15 Claims, 4 Drawing Sheets

(56) References Cited

U.S. PATENT DOCUMENTS

| | | | |
|---|---|---|---|
| 2010/0161362 A1* | 6/2010 | Shapira | G06Q 30/04 |
| | | | 705/7.11 |
| 2014/0195933 A1 | 7/2014 | Rao Dv | |
| 2014/0229215 A1 | 8/2014 | Bernier | |
| 2015/0358266 A1 | 12/2015 | Kaplinger et al. | |
| 2016/0057499 A1* | 2/2016 | Foerster | H04N 21/4758 |
| | | | 705/319 |
| 2017/0068906 A1* | 3/2017 | Korycki | G06Q 10/107 |
| 2018/0278561 A1 | 9/2018 | Carnevale et al. | |

OTHER PUBLICATIONS

Office Action (dated Jun. 28, 2019) for U.S. Appl. No. 15/468,421, filed Mar. 24, 2017.
Amendment (dated Sep. 27, 2019) for U.S. Appl. No. 15/468,421, filed Mar. 24, 2017.
Notice of Allowance (dated Dec. 30, 2019) for U.S. Appl. No. 15/468,421, filed Mar. 24, 2017.

\* cited by examiner 300 system

- 302 text message generator
- 304 semantic engine
- 306 collection module
- 308 surprise factor determination engine
- 310 transmitting module

FIG. 3

DOCUMENT PROCESSING

This application is a continuation application claiming priority to Ser. No. 15/468,421, filed Mar. 24, 2017, now U.S. Pat. No. 10,645,044 issued May 5, 2020.

TECHNICAL FIELD

The invention relates generally to a communication tone analysis, and more specifically, to a computer-implemented method for validating a text message to be sent by a communication tool.

BACKGROUND

The requirement for a tight collaboration in working environments as well as a strong wish for increased personal communication grows every day. Often, such a communication is based on text messages which are exchanged using a variety of different communication tools. Many times, chat sessions are used in personal and work scenarios. In some cases, the communication is one-to-one. In other cases, many people are involved in the communication. The underlying communication tools typically allow exchanging messages in multiple windows quasi-simultaneously.

In personal communication, a problem that may occur is a sender addressing a sentence, a phrase or complete message to a wrong person; i.e., to a person whose communication thread may be open in a different window. The sender may have chosen, for example, wrong expressions, the wrong context, or the wrong message tone.

Several attempts have been made to address the preceding shortcomings; for example: by using different colors for each recipient or by showing the name or an image of the recipient in a prominent way. However, the sender of the message can be so focused on what the sender is typing that no attention is paid by the sender to the color scheme or icons.

SUMMARY

Embodiments of the present invention provide a method, and an associated computer system and computer program product, for processing a text message to be sent by electronic mail (email) to a receiving address. One or more processors of the computer system generate a text message addressed to the receiving address using a communication tool. The one or more processors analyze the text message using a semantic engine and assign a content score value to the text message for each content category of a plurality of content categories. The one or more processors collect context data values relating to the text message and to a plurality of context categories. The one or more processors determine a context score value for each context category of the plurality of context categories by comparing the context data values of the text message with context data threshold values and by comparing the content score value of the text message for each content category of the plurality of content categories against content threshold values. The one or more processors calculate a surprise factor value by comparing the context score values with the content score values. The one or more processors ascertain whether the difference factor value is greater than a specified difference factor threshold value. If it is ascertained that the difference factor value is greater than the specified difference factor threshold value, then the one or more processors request a confirmation before sending the text message to the receiving address, and if the confirmation is subsequently received then the one or more processors send the text message by electronic mail to the receiving address. If it is ascertained that the difference factor value is not greater than the specified difference factor threshold value, then the one or more processors send the text message by electronic mail to the receiving address.

BRIEF DESCRIPTION OF THE DRAWINGS

Embodiments of the invention will be described, by way of example only, and with reference to the following drawings.

FIG. 3 shows a block diagram of a system for validating a text message, in accordance with embodiments of the present invention.

DETAILED DESCRIPTION

Figure 1:
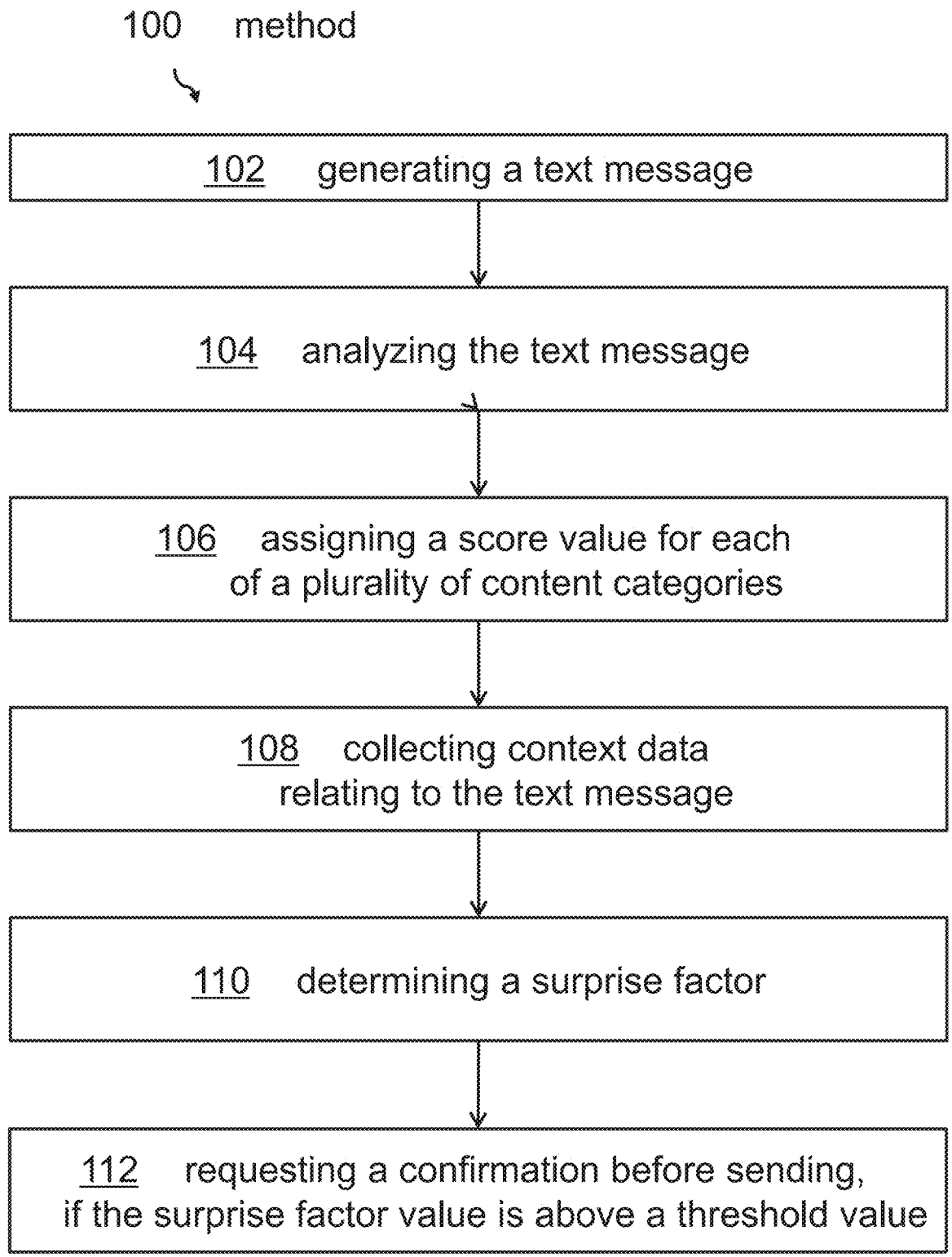
FIG. 1 is a flow chart describing a method for validating a text message to be sent by a communication tool, in accordance with embodiments of the present invention.

The term 'text message' may denote one or more words in any language intended to be sent electronically from a sender to a receiver; i.e., from a sender address to a receiver address using electronic communication tools (e.g., by electronic mail; i.e., email). The text message may trigger an answer which may also be transmitted back to the sender in form of a text message. By exchanging text messages forth and back, a dialogue may be established. Hence, the text message may be an initiating or a one-off message or a response to an incoming message. The incoming message may also be an image.

The term 'communication tool' may denote any computerized vehicle intended for exchanging data (e.g., text messages). The communication tool may, e.g., be a chat program, an email program or other communication means (e.g., for writing a text message for a web log (BLOG) or other billboard-like communication channels).

The term 'semantic engine' may denote a software or hardware-based tool adapted for finding semantic similarities. A semantic similarity may be a metric defined over a set of documents or terms, where a distance between documents is based on measures such as the likeness of meaning or semantic content of the documents as opposed to similarity of the documents, wherein the similarity can be estimated regarding syntactical representation of the documents (e.g., string format). The preceding measures are mathematical tools used to estimate the strength of the semantic relationship between units of language, concepts or instances, through a numerical description obtained according to the comparison of information supporting the meaning or describing the nature of the content of the documents. The term semantic similarity is often confused with semantic relatedness. Semantic relatedness includes any relation between two terms while semantic similarity only includes "is a" relations. For example, "car" is similar to "bus", but is also related to "road" and "driving".

Computationally, semantic similarity can be estimated by defining a topological similarity, by using ontologies to define the distance between terms and/or concepts. For example, a metric for the comparison of concepts ordered in a partially ordered set and represented as nodes of a directed acyclic graph (e.g., a taxonomy) would be the shortest path linking the two concept nodes. Based on text analyses, semantic relatedness between units of language (e.g., words, sentences) can be estimated using statistical means such as a vector space model to correlate words and textual contexts from a suitable text corpus.

Alternatively, instead of the semantic engine, a 'sentiment analysis tool' may be used. In the context of the present invention, the term 'sentiment analysis tool' may be understood as a tool adapted for assigning a feeling or an emotion to words and sentences analyzed.

The term 'score value' may denote a numerical value expressed as a percentage or a value between 0 and 1, expressing a semantic similarity of individual words of a text message or the tone of the text message in light of a plurality of different content categories. For each text message, a score value for each content category of the plurality of content categories may be assigned.

The term 'content category' may denote different semantic contexts in which text messages may be generated; e.g., "business", "sports", "leisure", "friend", etc. More categories are discussed below.

The term 'context categories' may denote metadata describing environmental data (in particular, measurable technical environmental data) for a specific text message. Context categories may range from the generation time of the text message to the logical or physical address the text message is intended to be sent to. The different context categories may have 'context data values'. A list of potential context data categories are discussed below.

The term 'difference factor' may denote a description of a similarity or discrepancy in context and/or tone between a received message and a related message to be sent. The larger the semantic difference between a received message and a message to be sent is, the higher the numerical value is and the higher the difference factor may be. Other factors and/or metadata than the semantic difference may also be instrumental in determining a difference factor.

The term 'previous context data' may denote historic data of text message exchanges, which may describe a repository of metadata of previously exchanged text messages.

It may also be noted that the term 'previous' (in particular previous data) may relate to stored data of past messages before the actual processing; i.e., to earlier text messages or historic data.

The computer-implemented method of the present invention for validating a text message to be sent by a communication tool may offer multiple advantages and technical effects:

The present invention may be instrumental in avoiding sending wrong text messages, using a communication tool, to receivers to whom the message is not intended. This avoidance of sending wrong text messages may avoid embarrassments, misunderstandings, triggering of long discussions or other unintended effects, and may also be seen as a way to avoid completely out of context answers to a comment or question. These out of context answers may generate a longer discussion using the communication tool. However, the communication tools in the context of the present invention may be used for exchanges of short textual contributions. If such misunderstandings happen, typically a series of excuses and explanations follows which may lead to a capacity overload of the technical environment of the communication tool. Thus, by avoiding the wrong tone or the wrong context for a message to be sent, an additional computational load may be avoided in the technical infrastructure, and as a consequence will help the users to save time. In extreme cases, heavy consequences of a misdirected message may be avoided (e.g., avoidance of a harsh comment about the boss requesting extra hours, originally intended for a family member at home, being erroneously directed to the boss).

According to one embodiment of the method of the present invention in which the plurality of content categories and the plurality of context categories contain identical categories, wherein n is at least 2, the difference factor may be calculated by $$\text{difference} = \text{sqrt}[\Sigma_1{}^n((\text{context\_score}_i - \text{content\_score}_i)^2)], \text{ wherein}$$

difference=difference factor value,
sqrt=square root,
context_score$_i$=the score value for the context of the i-th identical category,
content_score$_i$=the score value for the content of the i-th identical category, and
i=a counter for the n identical categories.

Thus, the formula expresses a distance between content scores and context scores for different content categories which are common to the plurality of content categories and the plurality of context categories. It may be useful to normalize the score values of content_score$_i$ and context_score$_i$ before the calculation. An example discussed in conjunction with the figures will clarify this normalization in more detail.

According to one embodiment of the method, the content category is selected from: formal, friendly, romantic, adverse, slang. The preceding content categories may relate to a business environment, or to a private or other communication context. For one text message, an individual score value may be assigned for each content category. Thus, one text message may have a score value for the category "formal" and another score value for the category "friendly", and so on. The result may be a score vector with the categories as dimensions.

According to one embodiment of the method, the semantic engine may use a repository of expressions that may be extendable each time an unrecognized expression may appear in the text message, which represents an underlying user-enabled, self-learning concept for the semantic engine. The user may categorize the unknown expression which may then be stored in relation to a category, which enables the user to define additional content categories.

According to one embodiment of the method, the context categories may comprise a selection of at least one attribute value relating to the receiving address. The receiving address may be obtained from a receiver profile (e.g., marked as "from my boss", "from a friend", etc.—day of week, time of day, type of network connection). The receiving address may be obtained from a company intranet, meaning most probably business context/formal. The receiving address may be obtained from a predetermined directory (e.g., corporate LDAP (Lightweight Directory Access Protocol) or other directory). The receiving address may be obtained from a predetermined internet domain and previous text messages exchanged with receiving address. Thus, all available metadata relating to a text message may be collected in order to determine a context cloud in which the text message may fit.

According to one embodiment of the method, the steps of the method may be performed by a communication tool component being executed by an endpoint device. Thus, all required determinations may be performed locally in a personal computer (PC), tablet computer, smartphone, or any other user-oriented device. Alternatively, the steps of the method may be performed by a communication tool component being executed by a server component of the communication tool, which may allow for a more thorough semantic analysis because typically more computing power or larger repositories may be available on a server. This implementation alternative may also be used in cloud computing environments (e.g., if the communication tool may be provided as SaaS (Software-as-a-Service)).

According to one embodiment of the method, the communication tool may be a chat program, an email program, a short message service (SMS) program, a web log program, a news group posting program or any other text-based communication mechanism. The method may also apply to a work processor such that a first part of a text may be evaluated against a second part of a text such that the first part may represent a received text message and the second part may represent the text message to be sent. Also different documents in the same directory, or with respect to another categorizing factor, may be compared.

According to an embodiment of the method, the communication tool may be enabled for a quasi-simultaneous communication with a plurality of receiving addresses. Thus, text messages to different intended addresses may be generated in different windows of a graphical user interface in which a plurality of different text generation windows may be open.

In the following, a detailed description of the figures will be given. All instructions in the figures are schematic. Firstly, a block diagram of an embodiment of the inventive computer-implemented method for validating a text message, to be sent by a communication tool, is given. Afterwards, further embodiments, as well as embodiments of the system for validating a text message, to be sent by a communication tool, will be described.

FIG. 1 is a flow chart describing a method 100 for validating a text message to be sent by a communication tool, in accordance with embodiments of the present invention. The method 100 comprises generating, in step 102, a text message by a user of the communication tool, addressed to a receiving address belonging to a communication partner. The text message may be an initial message or a response to a received message.

The method 100 comprises analyzing, in step 104, the text message using a semantic engine, or a sentiment analysis tool, and assigning, in step 106, a score value for each content category of a plurality of content categories pertaining to the text message. Examples of content categories are: formal, friendly, romantic, adverse, slang; other potential content categories may comprise business, work, leisure, sports, weather, etc.

Furthermore, the method comprises collecting, in step 108, context data values relating to the text message, wherein the context data relate to a plurality of context categories. These context data are basically metadata of the text message or metadata of a received message to which the new message is intended to be a response. Examples have been described above. Then, the method comprises determining, in step 110, a difference factor value by comparing the context data values of the text message with previous (i.e., historic) context data values of text messages exchanged with the receiving address and by comparing the score value of the text message for each content category of the plurality of content categories against a set of related content threshold values.

The method comprises requesting, in step 112, a confirmation (from a user) before sending the text message (in case the difference factor value is above a difference factor threshold value). Finally, the method comprises updating the previous data related to the receiving address, which may represent a learning aspect or self-optimization of the method and the related system. For Example, the previous data set may be enhanced by adding the current text message with the scoring values and the context data of the current text message to a repository of historic messages.

Figure 2:
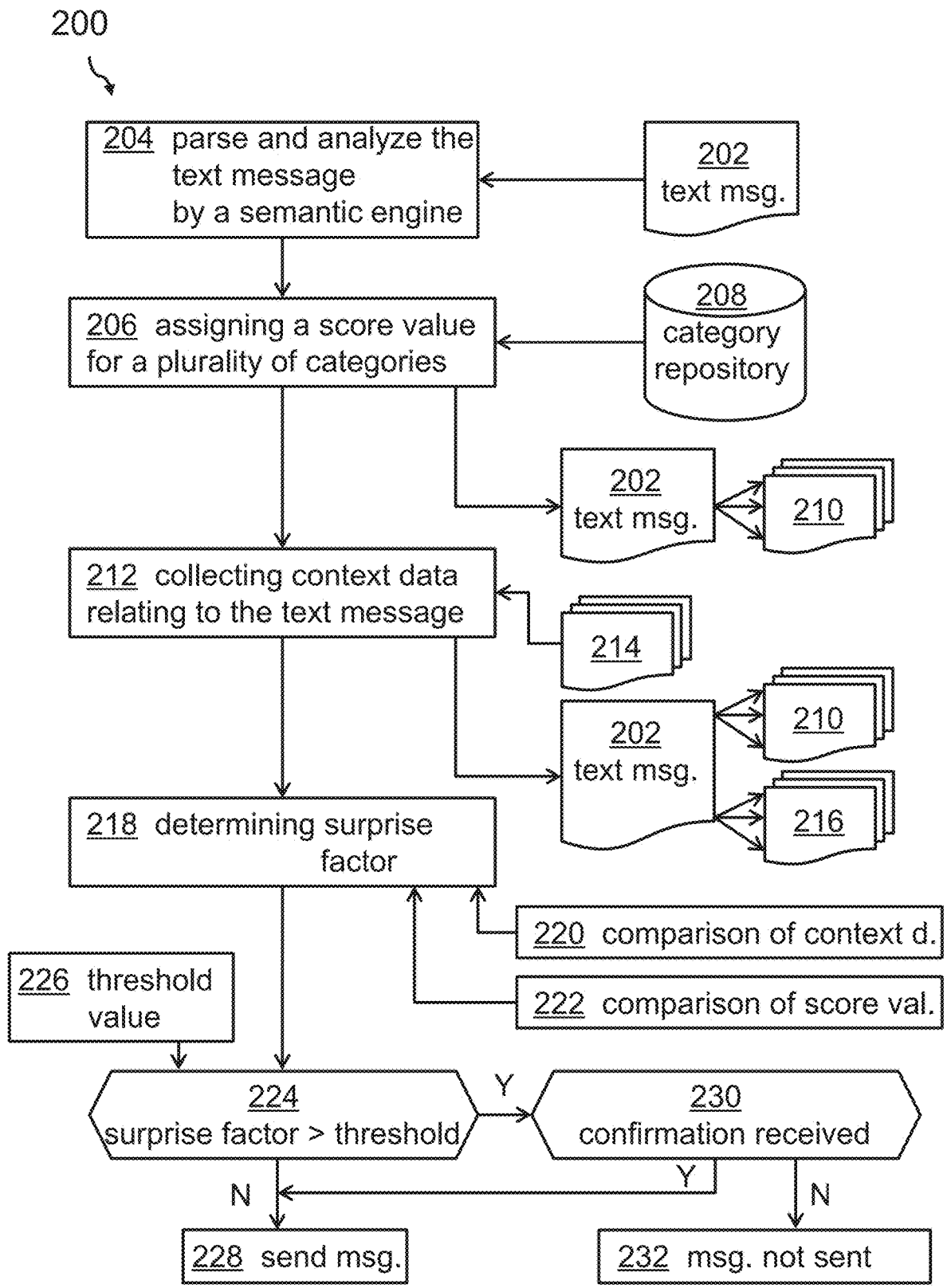
FIG. 2 shows a block diagram of a detailed embodiment of the method, of FIG. 1, in accordance with embodiments of the present invention.

FIG. 2 shows a block diagram of a detailed embodiment 200 of the method 100 of FIG. 1, in accordance with embodiments of the present invention. The diagram starts with receiving a generated text message 202 which is parsed and analyzed, in step 204, by the semantic engine. Then, score values for a plurality of categories are assigned, in step 206, to the text message. A category repository 208 may be used as input for assigning score values for the categories of the plurality of categories. As a result, the text message 202 has assigned score values 210 for each different content category of the plurality of categories.

As an example of categories for a specific conversation in a given context, the following content categories and related values in Table 1 may be considered for the received first text message 202:

TABLE 1

| content category | value |
|---|---|
| formal | 30% |
| friendly | 40% |
| romantic | 5% |
| adverse | 2% |
| slang | 10% |

A second text message 202 such as "yo, finally got the blue shirt you where talkin' bout?!" may be classified as shown in Table 2:

TABLE 2

| content category | value |
|---|---|
| formal | 2% |
| friendly | 80% |
| romantic | 40% |
| adverse | 30% |
| slang | 90% |

Answering the first, received text message 202 classified with the values in Table 1 with the second exemplary text message 202 to be sent may represent a large mismatch in the current conversation. If the user still confirms the sending of the second message, the content categories may be adapted and redefined, in Table 3, to:

TABLE 3

| content category | value |
|---|---|
| formal | 15% |
| friendly | 60% |
| romantic | 20% |
| adverse | 15% |
| slang | 60% |

Thus, a confirmation to send the message anyway, even in light of a warning and required confirmation, may be implemented by having the category values redefined automatically.

Next, according to the method, context data 214, relating to the text message, are collected in step 212. As a result, the text message 202 has two sets of data accompanying the text message 202: the score values 210 for the different content categories and the context data 216.

The method continues with a determination, in step 218, of a difference factor value. In one embodiment for determining the difference factor value in step 218, a comparison, in step 220, of the context data with context data threshold values is performed as well as a comparison, in step 222, of the content score values for the different content categories with related content threshold values. In this embodiment, context score values and content score values which may be determined from the results obtained from performing steps 220 and 222, are used in step 218 to calculate the difference factor value. With respect to step 220, the context score values for use in step 218 are limited to values of the context data that exceed the context data threshold values. With respect to step 222, the content score values for use in step 218 are limited to content score values that exceed the content threshold values.

Then it is determined, in step 224, whether the difference factor value is larger than a difference factor threshold value 226. If the difference factor value is not larger than the difference factor threshold value (case "N"), then the text message 202 is sent, in step 228, directly. If the difference factor value is larger than the difference factor threshold value (case "Y"), then it is determined, in step 230, whether a confirmation is received (e.g., via input by a user); i.e., whether to send the message despite the fact that a difference factor threshold value is exceeded. For this, a warning is displayed as part of the communication tool, potentially with the difference between the difference factor value and the related threshold value 226, and the user may confirm by a related input. If the warning was successful and the user does not want to send the text message 202, the text message 202 will not be sent (step 232). Otherwise, the text message 202 will be sent in step 228.

The updating of the previous (i.e., historic) data may be seen as an important step in the self-learning part of the inventive system and method, which may apply especially in light of a redefinition of the content score values if a confirmation is given after a warning potentially to not send the text message. This repository of historic chat (or other communication means) data may search for typical conversation tone and context data combinations. If, e.g., 80% of past communications (i.e., text message exchanges) with Jane Honda is classified as "romantic", the probability for a high "formal" score (e.g. >80%) of an intended text message is relatively low. In such a case, a warning would be generated to the user and a confirmation for a sending would be requested.

In another example, a text message response to Peter Brown with an overwhelming score for "adverse" may also have a high difference factor if the metadata of former messages reveal that Peter Brown is the boss of the intended response. Other examples may be related to the address of the intended recipient if the text message is in the corporate recipient directory. Also in this case a too "romantic" classified may be inappropriate and thus have a high difference factor (potentially above the threshold value) so that a confirmation for sending the text message may be required.

From another perspective, the following example may make the calculation schema even more transparent for a skilled person:

The category "formal" was experienced 190 times in the past. The following context data are available:

For context "name", i.e., the sender of the received message, the recorded history of these 190 occurrences is:
155 "myboss", 15 "john", 12 "bob", 6 "work team", 2 "jane";
for context "ip address" the history is:
120 times "10.0.77.4", 35 times "10.0.77.6", 25 times "10.0.77.9", 8 times "10.0.77.12", 2 times "10.0.77.16", and so on.

When evaluating a new context, a score is calculated for each context category; starting with "formal":

The current context has "name"="myboss" and "ip"="10.0.77.10" (ip=IP (Internet Protocol)) address.

By examining "name", "myboss" is known, and appears 155 times out of 190 times, so a score is 155/190=0.815, plus 1 to express that a perfect match was found, giving a total score value of 1.815. Such an extra "+1" factor may be added for clearly known values which have been identified in the past more often than a predefined threshold value and which are user assigned. In case the value is only known and not user assigned, then a "+0.5" extra value may be added for such a probability calculation result. Thus, known values may score form 0.501 (in case the calculated probability is only 1%) to 1.5 (in case the probability is calculated as 1.0). Other correction factors may be used and assigned based on experiences made with the method and system. The other correction factors may be enterprise or vertical industry dependent. Also other factors such as age differences between a sender and a responder may be reflected if the profile data can deliver such detailed information.

By examining "ip", "10.0.77.10" is unknown, a score of 0 is considered.

A sum of all the scores is 1.815+0=1.815 as total score for "formal".

In the same way the category score can be estimated for "slang", "romantic", "adverse",
The results could be:
context-"formal": 1.815,
context-"romantic": 0.120,
context-"adverse": 0.060.
The preceding values characterize the context.
The semantic tool will have generated an analog list of scores by examining the text content.
For example:
message-"formal": 4.5,
message-"romantic": 1.1,
message-"adverse": 0.30.
The difference factor is calculated by firstly normalizing the data to have sums equal to 1.
context-"formal": 0.909,
context-"romantic": 0.060,
context-"adverse": 0.030.
message-"formal": 0.762,
message-"romantic": 0.186,
message-"adverse": 0.050.
These values are now estimates of probabilities. The relating difference factor is then calculated by considering the distance between corresponding categories, that is:

$$\text{difference}=\text{sqrt}((0.909-0.762)^2+(0.060-0.186)^2+(0.300-0.050)^2)=0.194.$$

A suitable threshold can be for example 0.3. In the above example, 0.194 is less than 0.3, so no waring is generated.

In the preceding example, the content categories of the message (formal, romantic, adverse) are the same categories as the context categories of the context.

Another example message may be:
message-"formal": 0.262, message-"romantic": 0.686,
message-"adverse": 0.050.
In this case, the calculation is similar:

$$\text{difference} = \sqrt{(0.909-0.262)^2 + (0.060-0.686)^2 + (0.300-0.050)^2} = 0.934$$

which is above 0.3, and a warning is generated. However, this should not come unexpected: There is indeed a strong mismatch between a formal context and a romantic message.

The approach of using a vector distance is one option for calculating the requirement for a warning. Other calculation methods may also be used.

FIG. 3 shows a block diagram of a system 300 for validating a text message, in accordance with embodiments of the present invention. The system comprises a text message generator 302 adapted for generating a text message addressed to a receiving address. The text message generator, which may come in form of a text editor, may be a component of the communication tool. The system comprises further a semantic engine 304 adapted for analyzing the text message and adapted for assigning a score value for each content category of a plurality of content categories to the text message, and a collection module 306 adapted for collecting context data values relating to the text message, wherein the context data relate to a plurality of context categories.

Additionally, the system comprises a difference factor determination engine 308 adapted for determining a difference factor value by comparing the context data values of the text message with previous context data values of text messages exchanged with the receiving address and by comparing the score value of the text message for each content category of the plurality of content categories against a set of related content threshold values, as well as a transmitting module 310 adapted for requesting a confirmation before sending the text message, in case the difference factor value is above a difference factor threshold value. The transmitting module 310 may also be adapted for updating the previous data related to the receiving address.

Embodiments of the invention may be implemented together with virtually any type of computer, regardless of the platform being suitable for storing and/or executing program code.

Figure 4:
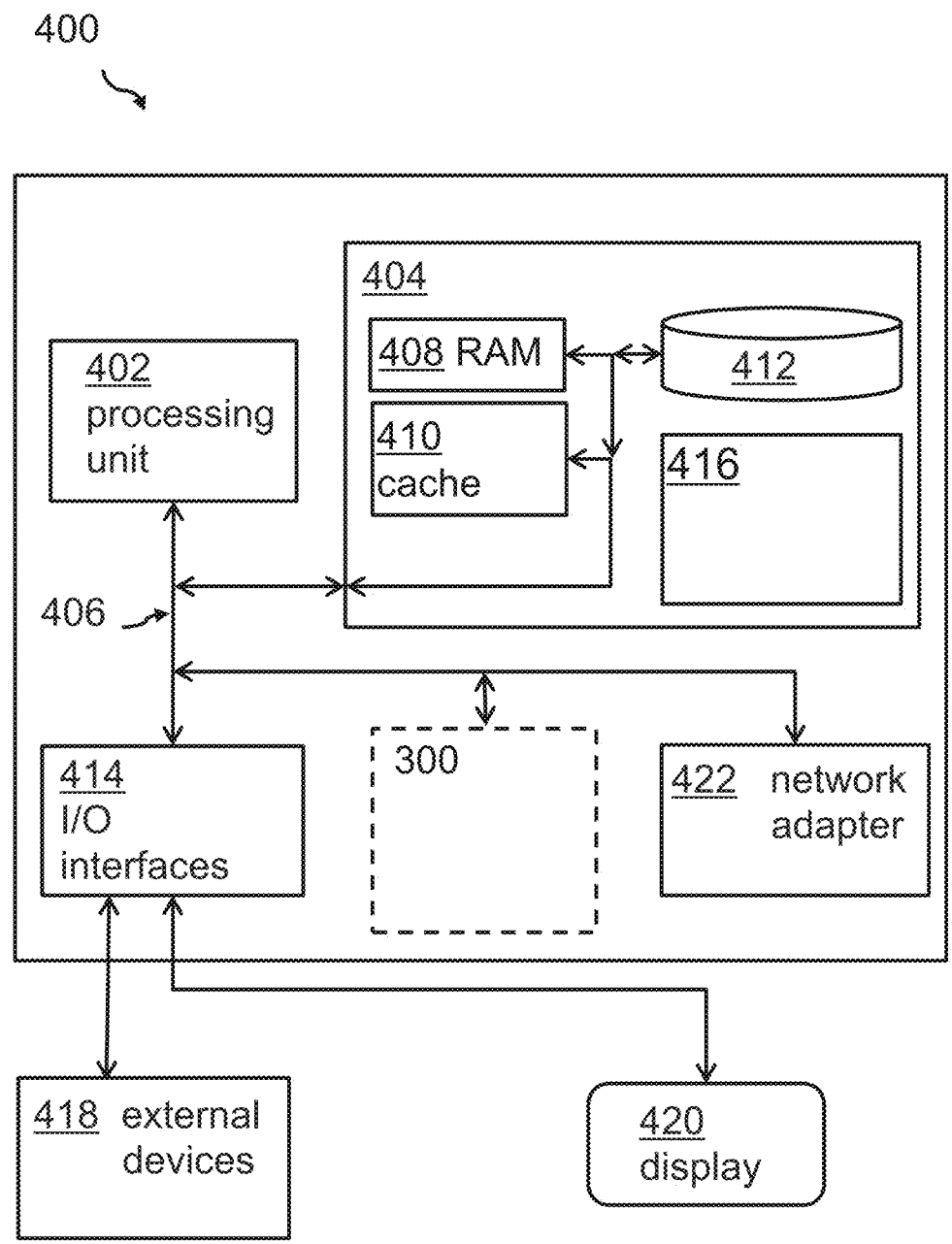
FIG. 4 shows an embodiment of a computer system configured to implement methods of the present invention.

FIG. 4 shows an embodiment of a computer system 400 configured to implement methods of the present invention.

The computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400.

Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couples various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, system 300 for validating a text message to be sent by a communication tool may also be attached to the bus system 406.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for processing a text message to be sent by electronic mail (email) to a receiving address, said method comprising:

assigning, by one or more processors of a computer system, a content score value to a text message for each content category of a plurality of content categories;

collecting, by the one or more processors, context data values relating to the text message and to a plurality of context categories;

determining, by the one or more processors, a context score value for each context category of the plurality of context categories by comparing the context data values with context data threshold values and determining, by the one or more processors, the context score values from only those context data values that exceed the context data threshold values, wherein said determining the context score value for each context category comprises computing, for each context category, the context score value as a function of a ratio of a total number of occurrences of a current context data value that exceeds the context data threshold values to a total number of occurrences of all context data values that exceed the context data threshold values;

determining, by the one or more processors, a content score value for each content category of the plurality of content categories by comparing the content score value of the text message for each content category of the plurality of content categories against content data threshold values and determining the content score values from only those content data values that exceed the content data threshold values;

calculating, by the one or more processors, a difference factor value, wherein the plurality of content categories and the plurality of context categories contain n identical categories, wherein n is at least 2, and wherein the difference factor is calculated by:

difference factor value=$\text{sqrt}[\Sigma_1^n((\text{context\_score}_i - \text{content\_score}_i)^2)]$, wherein sqrt=square root, context_score=the context score value for the context of the i-th identical category, content_score=the content score value for the content of the i-th identical category, and i=a counter for the n identical categories;

ascertaining, by the one or more processors, whether the difference factor value is greater than a specified difference factor threshold value;

if said ascertaining ascertains that the difference factor value is greater than the specified difference factor threshold value, then requesting, by the one or more processors, a confirmation before sending the text message to a receiving address, and if the confirmation is subsequently received then sending, by the one or more processors, the text message by electronic mail to the receiving address;

if said ascertaining ascertains that the difference factor value is not greater than the specified difference factor threshold value, then sending, by the one or more processors, the text message by electronic mail to the receiving address.

2. The method of claim 1, wherein said ascertaining ascertains that the difference factor value is greater than the specified difference factor threshold value, and wherein the confirmation is subsequently received.

3. The method of claim 1, wherein said ascertaining ascertains that the difference factor value is not greater than the specified difference factor threshold value.

4. The method of claim 1, wherein the plurality of context categories comprise at least one context category selected from the group consisting of at least one attribute value relating to the receiving address, day of week, time of day, type of network connection, receiving address from predetermined directory, receiving address from predetermined internet domain, previous text messages exchanged with the receiving address, and combinations thereof.

5. The method of claim 1, wherein the context data values are metadata of previous historical messages exchanged with the receiving address.

6. A computer program product, comprising one or more computer readable hardware storage devices having computer readable program code stored therein, said program code containing instructions executable by one or more processors of a computer system to implement a method for processing a text message to be sent by electronic mail (email) to a receiving address, said method comprising:

assigning, by the one or more processors, a content score value to a text message for each content category of a plurality of content categories;

collecting, by the one or more processors, context data values relating to the text message and to a plurality of context categories;

determining, by the one or more processors, a context score value for each context category of the plurality of context categories by comparing the context data values with context data threshold values and determining, by the one or more processors, the context score values from only those context data values that exceed the context data threshold values, wherein said determining the context score value for each context category comprises computing, for each context category, the context score value as a function of a ratio of a total number of occurrences of a current context data value that exceeds the context data threshold values to a total number of occurrences of all context data values that exceed the context data threshold values;

determining, by the one or more processors, a content score value for each content category of the plurality of content categories by comparing the content score value of the text message for each content category of the plurality of content categories against content data threshold values and determining the content score values from only those content data values that exceed the content data threshold values;

calculating, by the one or more processors, a difference factor value, wherein the plurality of content categories and the plurality of context categories contain n identical categories, wherein n is at least 2, and wherein the difference factor is calculated by:

difference factor value=sqrt[$\Sigma_1^n((\text{context\_score}_i - \text{content\_score}_i)^2)$], wherein sqrt=square root, context_score=the context score value for the context of the i-th identical category, content_score=the content score value for the content of the i-th identical category, and i=a counter for the n identical categories;

ascertaining, by the one or more processors, whether the difference factor value is greater than a specified difference factor threshold value;

if said ascertaining ascertains that the difference factor value is greater than the specified difference factor threshold value, then requesting, by the one or more processors, a confirmation before sending the text message to a receiving address, and if the confirmation is subsequently received then sending, by the one or more processors, the text message by electronic mail to the receiving address;

if said ascertaining ascertains that the difference factor value is not greater than the specified difference factor threshold value, then sending, by the one or more processors, the text message by electronic mail to the receiving address.

7. The computer program product of claim 6, wherein said ascertaining ascertains that the difference factor value is greater than the specified difference factor threshold value, and wherein the confirmation is subsequently received.

8. The computer program product of claim 6, wherein said ascertaining ascertains that the difference factor value is not greater than the specified difference factor threshold value.

9. The computer program product of claim 6, wherein the plurality of context categories comprise at least one context category selected from the group consisting of at least one attribute value relating to the receiving address, day of week, time of day, type of network connection, receiving address from predetermined directory, receiving address from predetermined internet domain, previous text messages exchanged with the receiving address, and combinations thereof.

10. The computer program product of claim 6, wherein the context data values are metadata of previous historical messages exchanged with the receiving address.

11. A computer system, comprising one or more processors, one or more memories, and one or more computer readable hardware storage devices, said one or more hardware storage device containing program code executable by the one or more processors via the one or more memories to implement a method for processing a text message to be sent by electronic mail (email) to a receiving address, said method comprising:

assigning, by the one or more processors, a content score value to a text message for each content category of a plurality of content categories;

collecting, by the one or more processors, context data values relating to the text message and to a plurality of context categories;

determining, by the one or more processors, a context score value for each context category of the plurality of context categories by comparing the context data values with context data threshold values and determining, by the one or more processors, the context score values from only those context data values that exceed the context data threshold values, wherein said determining the context score value for each context category comprises computing, for each context category, the context score value as a function of a ratio of a total number of occurrences of a current context data value that exceeds the context data threshold values to a total number of occurrences of all context data values that exceed the context data threshold values;

determining, by the one or more processors, a content score value for each content category of the plurality of content categories by comparing the content score value of the text message for each content category of the plurality of content categories against content data threshold values and determining the content score values from only those content data values that exceed the content data threshold values;

calculating, by the one or more processors, a difference factor value, wherein the plurality of content categories and the plurality of context categories contain n identical categories, wherein n is at least 2, and wherein the difference factor is calculated by:

difference factor value=$\text{sqrt}[\Sigma_1^n((\text{context\_score}_i - \text{content\_score}_i)^2)]$, wherein sqrt=square root, context_score=the context score value for the context of the i-th identical category, content_score=the content score value for the content of the i-th identical category, and i=a counter for the n identical categories;

ascertaining, by the one or more processors, whether the difference factor value is greater than a specified difference factor threshold value;

if said ascertaining ascertains that the difference factor value is greater than the specified difference factor threshold value, then requesting, by the one or more processors, a confirmation before sending the text message to a receiving address, and if the confirmation is subsequently received then sending, by the one or more processors, the text message by electronic mail to the receiving address;

if said ascertaining ascertains that the difference factor value is not greater than the specified difference factor threshold value, then sending, by the one or more processors, the text message by electronic mail to the receiving address.

12. The computer system of claim 11, wherein said ascertaining ascertains that the difference factor value is greater than the specified difference factor threshold value, and wherein the confirmation is subsequently received.

13. The computer system of claim 11, wherein said ascertaining ascertains that the difference factor value is not greater than the specified difference factor threshold value.

14. The computer system of claim 11, wherein the plurality of context categories comprise at least one context category selected from the group consisting of at least one attribute value relating to the receiving address, day of week, time of day, type of network connection, receiving address from predetermined directory, receiving address from predetermined internet domain, previous text messages exchanged with the receiving address, and combinations thereof.

15. The computer system of claim 11, wherein the context data values are metadata of previous historical messages exchanged with the receiving address.

* * * * *